(12) United States Patent
Gutierrez Munoz et al.

(10) Patent No.: US 9,892,201 B2
(45) Date of Patent: Feb. 13, 2018

(54) SEARCH ENGINE CLASSIFICATION

(71) Applicant: Microsoft Technology Licensing, LLC, Redmond, WA (US)

(72) Inventors: Alejandro Gutierrez Munoz, Redmond, WA (US); Jon Whisler, Seattle, WA (US); Adam Levi, Bellevue, WA (US); Michael Golebiewski, Mill Creek, WA (US); Igor Rondel, Redmond, WA (US); Shahab Moradi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 368 days.

(21) Appl. No.: 14/622,870

(22) Filed: Feb. 15, 2015

(65) Prior Publication Data
US 2016/0239572 A1    Aug. 18, 2016

(51) Int. Cl.
*G06F 7/00*    (2006.01)
*G06F 17/30*   (2006.01)

(52) U.S. Cl.
CPC .... *G06F 17/30867* (2013.01); *G06F 17/3053* (2013.01); *G06F 17/30598* (2013.01)

(58) Field of Classification Search
CPC ......... G06F 17/30864; G06F 17/30867; G06F 17/3053; G06F 17/30882
See application file for complete search history.

(56) References Cited

U.S. PATENT DOCUMENTS

| | | | |
|---|---|---|---|
| 7,383,282 B2 * | 6/2008 | Whitehead | G06F 17/30867 707/700 |
| 8,000,504 B2 | 8/2011 | Fan et al. | |
| 8,505,049 B2 | 8/2013 | Ellis et al. | |
| 2008/0147669 A1 * | 6/2008 | Liu | G06F 17/30864 |
| 2009/0034851 A1 * | 2/2009 | Fan | G06F 17/30029 382/230 |
| 2009/0313217 A1 * | 12/2009 | Signorini | G06F 17/30707 |

(Continued)

OTHER PUBLICATIONS

Gruhl, et al., "The Web Beyond Popularity—A Really Simple System for Web Scale RSS", In Proceedings of the 15th international conference on World Wide Web, May 23, 2006, 10 pages.

(Continued)

*Primary Examiner* — Tuan A Pham
(74) *Attorney, Agent, or Firm* — Law Offices of Richard Chi; Richard Chi

(57) ABSTRACT

Techniques for enabling a search engine to automatically classify the content type of Web documents. In an exemplary embodiment, Web documents may be classified as adult or non-adult, based on whether a document contains adult content. In an aspect, Web documents are mined offline to determine the presence of "adult hubs" to which adult documents are connected. The presence of such adult hubs is a strong indicator that linking Web documents may themselves contain adult content. Computational techniques for quantifying the connection between a candidate document and adult hubs are disclosed. The techniques may be utilized in an Internet search engine platform designed to accept user search queries and deliver highly relevant results.

18 Claims, 13 Drawing Sheets

(56) References Cited

U.S. PATENT DOCUMENTS

2011/0191097 A1* 8/2011 Spears ................ G06F 17/28
704/9
2012/0150850 A1* 6/2012 Parthasarathy ... G06F 17/30867
707/728

OTHER PUBLICATIONS

Luo, et al., "Pornography Detection with the Wisdom of Crowds", In Proceedings of 9th Asia Information Retrieval Societies Conference, Dec. 9, 2013, 13 pages.

Spirin, et al., "Survey on Web Spam Detection: Principles and Algorithms", In Proceedings of ACM SIGKDD Explorations Newsletter, vol. 13, Issue 2, Dec. 2012, 15 pages.

Lee, et al., "Generation of pornographic blacklist and its incremental update using an inverse chi-square based method", In Journal of Information Processing and Management: an International Journal archive, vol. 44, Issue 5, Sep. 1, 2008, 2 pages.

Lee, et al., "Mining search intents for collaborative cyberporn filtering", In Journal of the American Society for Information Science and Technology, vol. 63, Issue 2, Feb. 1, 2012, 2 pages.

Szummer, et al., "Behavioral Classification on the Click Graph", In Proceedings of the 17th international conference on World Wide Web, Apr. 21, 2008, 2 pages.

Hammami, et al., "WebGuard: A Web Filtering Engine Combining Textual, Structural, and Visual Content-Based Analysis", In IEEE Transactions on Knowledge and Data Engineering, vol. 18, No. 2, Feb. 2006, 13 pages.

Kim, et al., "An Efficient Text Filter for Adult Web Documents", In Proceedings of 8th International Conference on Advanced Communication Technology, , vol. 1, Feb. 22, 2006, 3 pages.

Santos, et al., "Adult Content Filtering through Compression-based Text Classification", In Proceedings of International Joint Conference, Sep. 5, 2012, 8 pages.

Wu, et al., "An efficient Method to Automatic Adult Image Identification", In International Journal of Digital Content Technology and its Applications, vol. 6, No. 22, Dec. 2012, 8 pages.

* cited by examiner

SEARCH ENGINE CLASSIFICATION

BACKGROUND

Widespread Internet use has led to the massive proliferation of documents on the World Wide Web. As many of these documents contain adult content unsuitable for minors, Web search engines must effectively identify and classify adult Web documents when responding to Internet search queries.

Current techniques for classifying adult content include analyzing features of a Web document in isolation, e.g., determining the presence of adult-oriented text embedded in the document. However, such text-based techniques are often inadequate when classifying documents containing sparse text, such as image or video websites. On the other hand, applying image- or video-based techniques to such websites, e.g., skin-color pixel analysis, may require significant computational resources to implement.

Accordingly, it would be desirable to provide novel and efficient techniques for accurately classifying adult Internet content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for search engine classification of adult Web content. In an aspect, Web documents are mined offline to determine the presence of adult hubs in networks of Web documents. Adult hubs may be detected based on classifying the types of documents linking to such hubs, as well as the expected document-level features of hubs. Once adult hubs are identified, a candidate Web document may be classified based on, e.g., the degree to which the candidate Web document is linked to one or more identified adult hubs. The techniques advantageously increase the accuracy of adult Web content classification for search engines.

Other advantages may become apparent from the following detailed description and drawings.

DETAILED DESCRIPTION

Various aspects of the technology described herein are generally directed towards techniques for classifying Internet adult content. It will be appreciated that certain features of the techniques described below may also be used for other types of Internet data classification, e.g., the identification of other types of documents containing potentially offensive or sensitive content. It will further be appreciated that the techniques described herein may generally be applied to identification of any types of documents linked in a network, and the classification and/or filtering of such documents according to whether they have a designated characteristic, e.g., the characteristic of possessing adult content. The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this Specification and in the Claims, a "document" may denote any Internet webpage, generally having any type of formatting.

Figure 1:
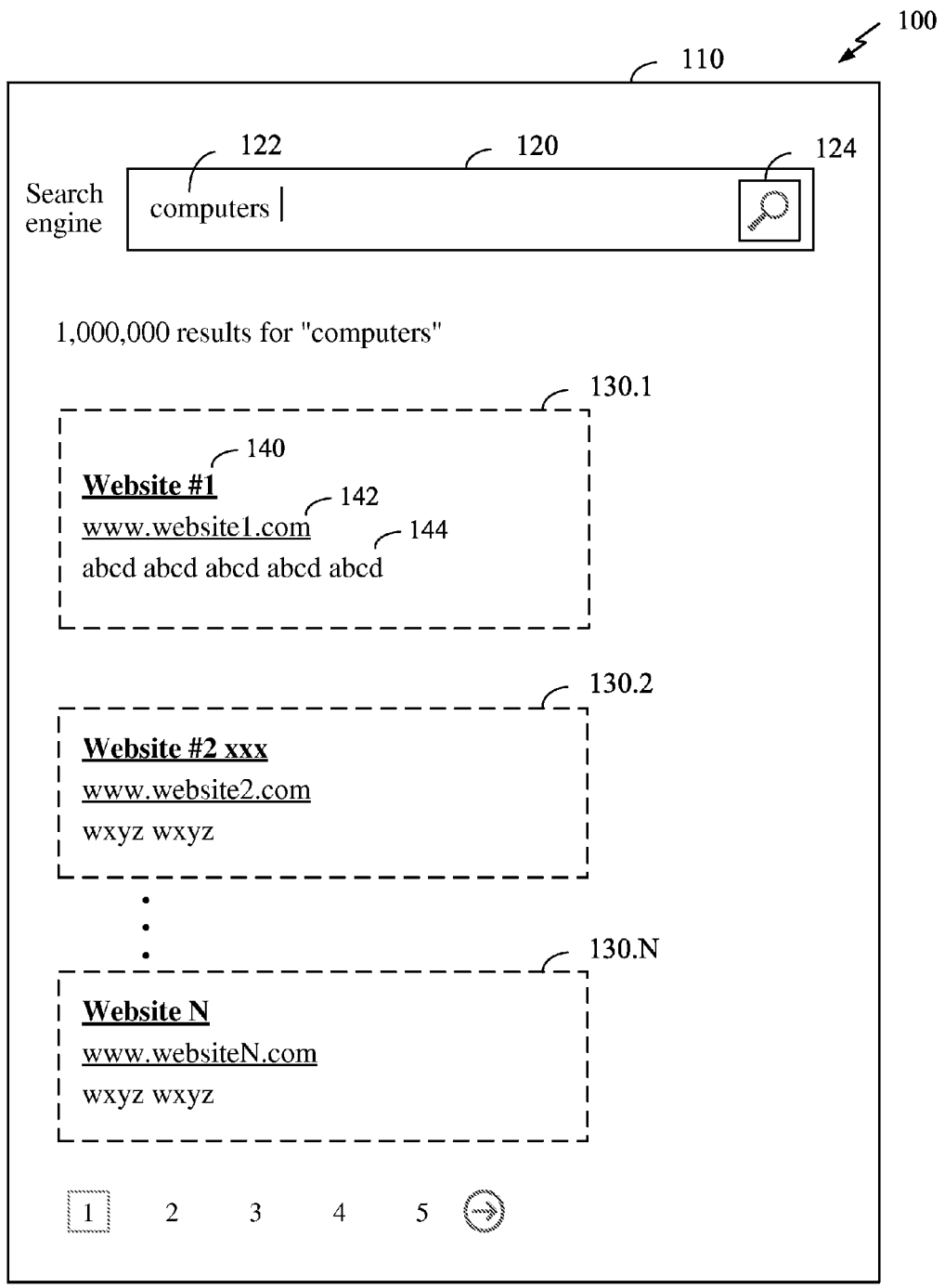
FIG. 1 illustrates an implementation of an interface for a Web search engine

FIG. 1 illustrates an implementation 100 of an interface for a Web search engine. Note FIG. 1 is shown for illustrative purposes only, and is not meant to limit the scope of the present disclosure to any particular applications of the techniques described.

In FIG. 1, the search engine interface may be presented as a web page 110, e.g., accessible via the Internet. A search box 120 accepts user text input 122 (here illustratively shown as the text "computers") representing a search query for information on the World Wide Web. After entering text input 122 and clicking a search button 124, the user may expect the search engine to return relevant Internet content.

Web page 110 further shows generic examples of relevant content as identified by the search engine, including a plurality of search results 130.1 through 130.N (wherein N represents an arbitrary integer). These search results correspond to web pages classified by the search engine as relevant to the user's typed query. For example, search result 130.1 may include a title 140 of a search result web page, a Uniform Resource Identifier (URL) 142 corresponding to the search result 130.1, and further descriptive text 144 associated with the search result 130.1.

Due to the large-scale proliferation of content on the World Wide Web in recent years, it has become critical for search engines to quickly and accurately identify the web pages that are most relevant to a user query. It is also desirable for search engines to identify and remove from the search results certain types of potentially offensive Web documents, such as documents containing explicit adult content unsuitable for minors.

Classifying adult content on the Internet is made difficult by several factors, including the wide range of adult document format types, some of which include little or no text. Furthermore, many adult webpages contain text or other features deliberately designed to mislead search engine algorithms, in an attempt to direct traffic to their websites. Misclassification may undesirably cause a search engine to inappropriately display listings corresponding to adult content in response to search requests for non-adult content. An instance of such an inappropriate display is shown in FIG. 1 as search result 130.2, which undesirably contains a link to adult content as suggested in the figure by the presence of the text "xxx" in the title. Alternatively, misclassification may undesirably cause a search engine to omit relevant adult display listings when responding to explicit search requests for adult content.

Figure 2:
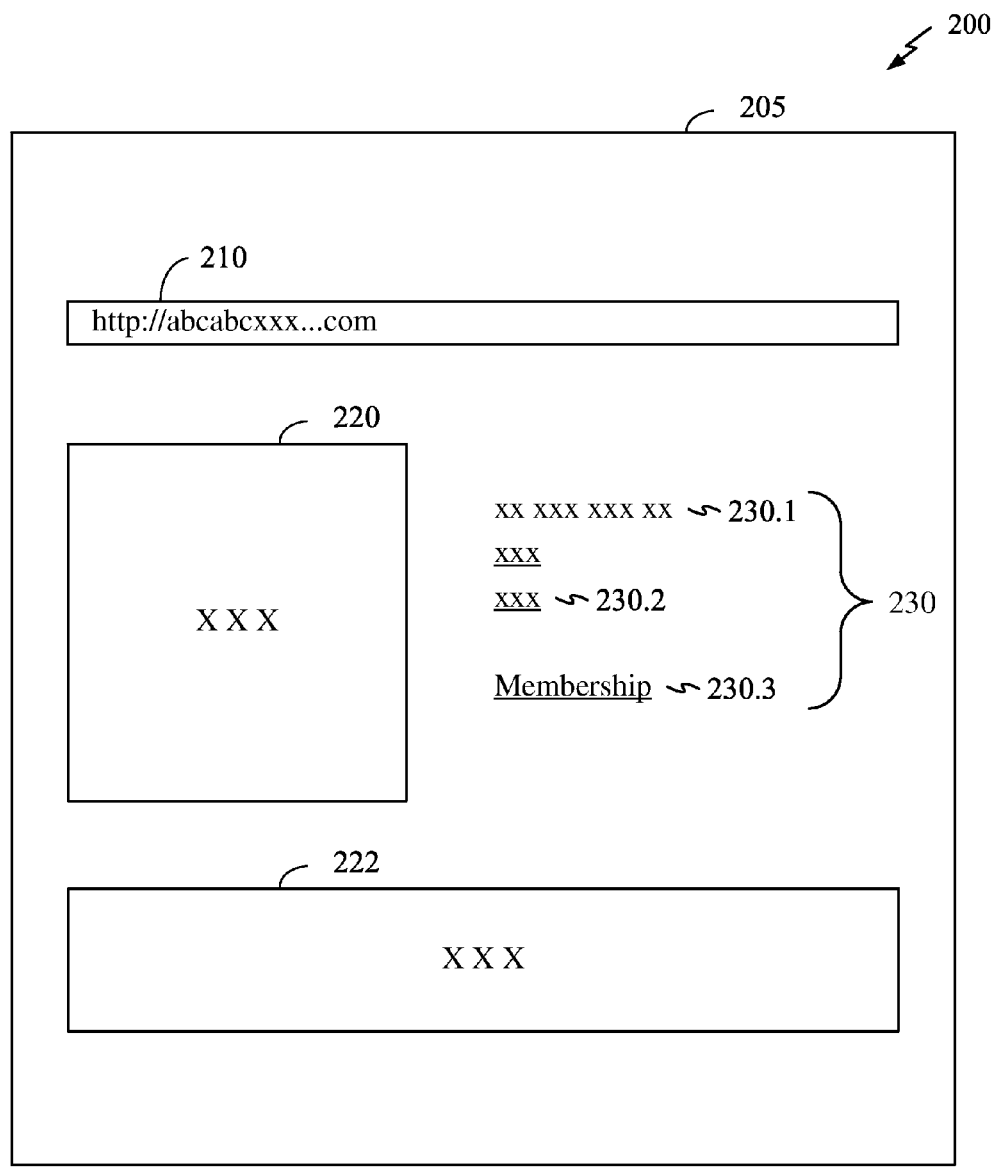
FIG. 2 illustrates an example Web document containing adult content, such as the user might be directed to if a search result is clicked.

FIG. 2 illustrates an example Web document 200 containing adult content that might be loaded onto a browser display if search result 130.2 is clicked. Note FIG. 2 is shown for illustrative purposes only to clarify some of the concepts and terminology used hereinbelow, and is not meant to limit the scope of the present disclosure to any particular formatting types or layouts of adult Web documents.

In FIG. 2, Web document 200 having an associated URL 210 is displayed by a Web browser 205. Document 200 may include media such as images and/or video 220 corresponding to adult content. Document 200 may further display various types of text 230, including ordinary (or "non-anchor") text 230.1, and/or anchor text 230.2 containing a link (e.g., hyperlink, including normal and/or JavaScript redirections) to a separate Web document. Document 200 may further include anchor text 230.3 containing a link to a membership website (not shown in FIG. 2). Document 200 may also include a "banner" 222, e.g., an animated or static image covering a link to another website (not shown).

To avoid displaying adult content in response to non-adult search queries, a search engine must effectively classify and filter out adult content from search results. Techniques for adult content classification typically analyze document-level features of a Web document, e.g., features specific to that single Web document. In particular, textual analysis techniques such as n-gram analysis may be applied to count the number of instances in the Web document of certain types of adult-specific "target text," e.g., concatenations of n (where n is an integer) words that are usually associated with adult content. For example, the body, anchor text 230.2, non-anchor text 230.1, URL 210, header, metatags, etc., of Web document 200 may be separately or collectively analyzed for the presence of adult-specific target text. As mentioned hereinabove, however, these techniques may not effectively classify certain types of adult content containing little or no text. Furthermore, document-level analysis may only correctly classify hosts that clearly feature adult content, while unreliably classifying hosts featuring some adult and some non-adult content.

Pixel analysis is another type of document-level analysis, wherein the pixels of an image or video in a Web document 200 may be analyzed to determine the presence of adult content. For example, the presence of a large proportion of skin-color pixels in an image or video may be an indicator of adult content. However, such pixel analysis techniques may require significant computational resources, and, when used in isolation, may not be very accurate in classifying adult content.

Accordingly, it would be desirable to provide improved techniques for effectively classifying adult content on the Internet. In an aspect of the present disclosure, adult content classification may consider the overall topology of a network of Web documents connected to a candidate document. In particular, a Web document may be more or less likely to contain adult content depending on whether other Web documents connected to it contain adult content. Furthermore, even if a Web document itself does not contain explicit adult content (e.g., such as might be identifiable through textual or image/video analysis), the fact that it is connected to other documents that are explicitly adult may make such a Web document an important indicator as to the presence of adult content in the network. Accordingly, the topology-based techniques described herein may readily be combined with document-level classification techniques, such as n-gram-based text categorization and/or image and video pixel analysis, to enhance the overall accuracy of adult content classification.

Figure 3:
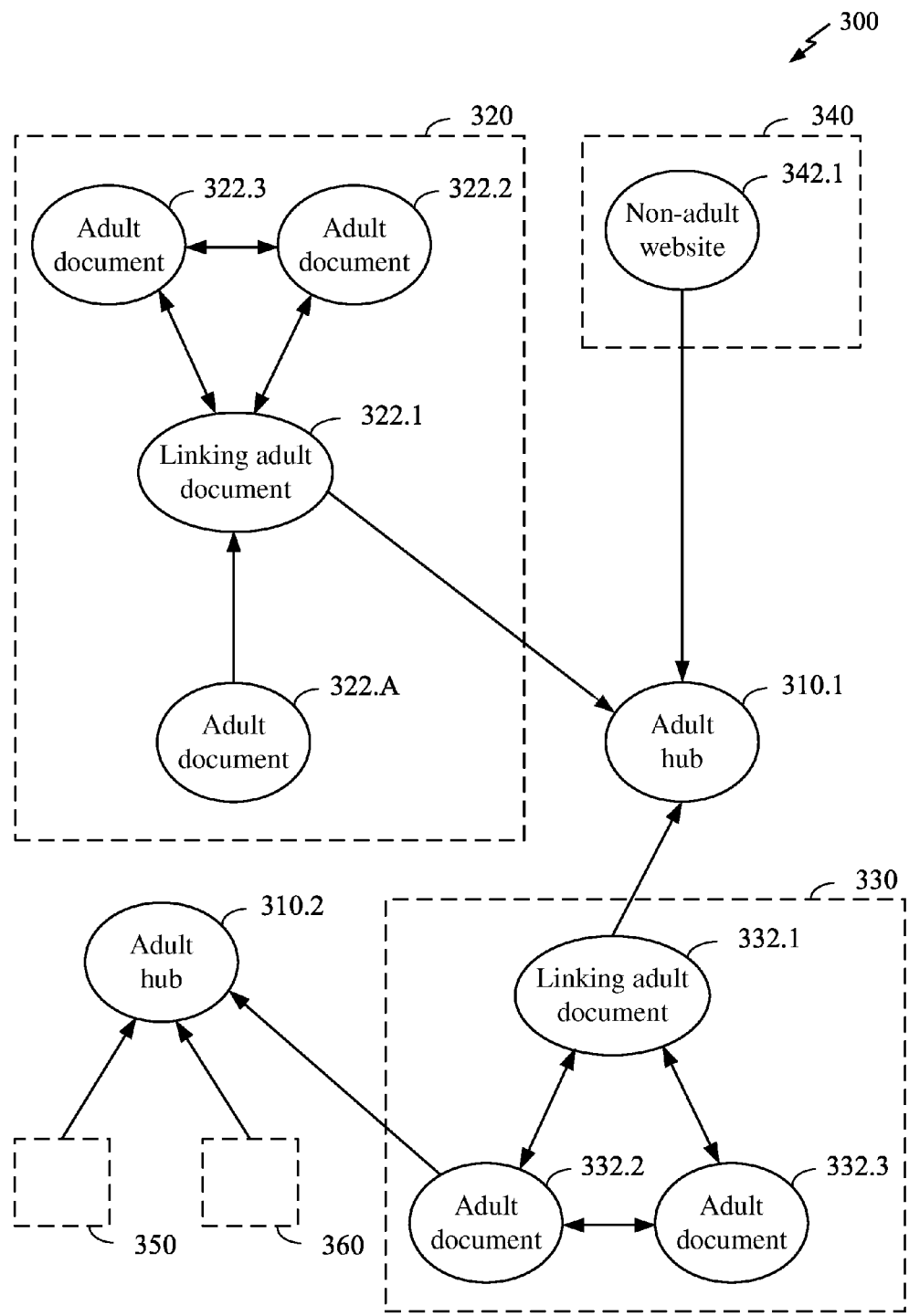
FIG. 3 illustrates an exemplary topology of a Web network illustrating certain aspects of the present disclosure.

FIG. 3 illustrates an exemplary topology of a Web network 300 illustrating certain aspects of the present disclosure. Note FIG. 3 is shown for illustrative purposes only, and is not meant to limit the scope of the present disclosure to any particular network topology, or any size, scale, or type of networks that can be supported using the techniques of the present disclosure.

In FIG. 3, a Web network 300 includes a plurality of Web documents. Each document may be connected to one or more other documents, as indicated by an arrow between two documents. In particular, an arrow originating from a first document terminating at a second document may designate that the first document contains a link to the second document, e.g., as implemented by anchor text displayed in the first document containing a link to the second document. A uni-directional arrow in FIG. 3 may designate that a first (or originating) document contains a link to a second (or destination) document, while the second document may or may not contain a link to the first document. In this instance, the uni-directional link from the first to the second document may also be denoted herein as an "inbound link" of the second document, or also an "outbound link" of the first document. A bi-directional arrow between first and second documents in FIG. 3 may designate that the first and second documents mutually contain links to each other.

Network 300 illustrates certain features typical of Internet webpages containing adult content. For example, certain documents such as 322.1, 322.2, . . . , 322.A (wherein any of the letters A, B, C as used herein may denote an arbitrary integer) may all belong to a single "domain," "host," or "container" 320. It will be understood that one or more hosts may be associated with a domain, e.g., the host-level URL "http://b.a.com" may be associated with a domain "http://a.com." Furthermore, a container may denote a path that aggregates one or more documents of a host or domain. For example, a domain "http://a.com" may include a container "http://a.com/1/" that holds two documents "http://a.com/1/aa.html" and "http://a.com/1/bb.html," while a host "http://b.a.com" may include a container "http://b.a.com/2/" that holds documents "http://b.a.com/2/cc.html" and "http://b.a-.com/2/dd.html." It will be understood that any of a "domain," "host," and "container" may also be termed a "document group" or simply "group" herein, unless otherwise noted.

In FIG. 3, any or all of adult documents 322.2, 322.3, . . . , 322.N may contain explicit adult content, e.g., pornographic video, images, or text. In this specification and in the claims, the designation of an entity, e.g., a document, a domain, a host, a container, etc., as "adult," may denote that such entity is generally associated with a website featuring explicit adult content. However, unless otherwise noted, an "adult" entity as used herein need not itself contain explicit adult content, e.g., an "an adult document" may or may not contain explicit adult content, while an "explicit adult document" does contain explicit adult content. Any of adult documents 322.2, 322.3, . . . , 322.A may link to a "linking adult document" 322.1, which links to an "adult hub" 310.1.

In this specification and in the claims, an "adult hub" denotes a document, website, container, host, domain, or collection of Internet resources that indicates a center of network relationships between other adult documents or adult document groups. An "adult hub" need not itself contain explicit adult content. A "linking adult document" denotes a document connecting an adult document with an adult hub, e.g., linking adult document 322.1 connects adult document 322.2 with adult hub 310.1.

In general, any adult document may be related to an adult hub by linking, hyperlink, redirection, search result, or any other type of link between two documents. These types of relations may be collectively denoted as "connections" herein. In some exemplary embodiments, adult hub 310.1 may reside in a separate domain from the adult domain 320 containing the linking adult document 322.1. In alternative exemplary embodiments, an adult hub may reside in the same domain as adult content related to it. In an exemplary embodiment, linking adult document 322.1 may also itself be considered an adult hub, e.g., if a proportion or absolute number of inbound links to it from adult documents (e.g., documents as preliminarily classified as adult using only document-level analysis) exceeds a certain threshold.

In one instance, linking adult document 322.1 may correspond to, e.g., a "membership" webpage offering user the terms of payment or subscription to adult domain 320. Linking adult document 322.1 may contain a link to adult hub 310.1, which may correspond to a webpage of a vendor specifically dedicated to processing credit card payments. When a user desiring to become a member of adult domain 320 clicks the link in document 322.1, the user may be directed to adult hub 310.1, e.g., for entering credit card information to complete the payment transaction. Note in such a scenario, adult hub 310.1 itself may not directly contain explicit adult content.

FIG. 3 further illustrates other features typical of Web networks containing adult content. For example, adult hub 310.1 may contain inbound links from other adult domains besides adult domain 320, an example of which is shown in FIG. 3 as adult domain 330. Adult domain 330 in turns includes a linking adult document 332.1 and other explicit adult documents such as adult documents 332.2, 332.3. It is noted that adult hubs may typically be connected to a plurality of, and, frequently, to many, adult document groups, such as adult domains, hosts, or containers. Such links from adult document groups to adult hubs may often be of an inbound nature from the perspective of an adult hub, e.g., the links may originate from an adult group and be bound for the adult hub. However, any adult hub may generally contain any of inbound, outbound, or bidirectional links to adult content, and the term "adult hub" as used herein may generally encompass hubs containing any types of connections to adult content.

Further shown in FIG. 3 is adult document 332.2 of adult domain 330 linking to another adult hub 310.2, which may itself connect to a plurality of adult document groups indicated by numerals 350, 360.

It is noted that adult hub 310.1 may further contain inbound links from non-adult domains, an example of which is shown in FIG. 3 as non-adult website 340. This may be consistent with the functionality performed by some types of adult hubs, e.g., credit card payment servicing or linking to advertising networks, wherein the services provided to an adult domain may also be provided to non-adult domains.

It is noted that generally, a node such as adult hub 310.1 may be linked to multiple adult domains, making the presence of such a hub an important indicator that there is adult content in the network 300. Examples of adult hubs include, e.g., webpages for adult advertisement networks, redirection networks, dynamic links executing JavaScript, adult video sharing sites, adult image galleries sites, adult blogs and forums, chatrooms, etc. Thus adult webpages on the Internet may be understood as being part of an overall "ecosystem" spanning possibly multiple domains, featuring "hubs" containing content that may or may not be explicitly adult, but which are nevertheless connected or related to adult documents.

In an exemplary embodiment, the classification of a candidate Web document as an "adult document" may be based on the degree to which that candidate document (and/or other documents connected to it) is connected to one or more identified adult hubs in the network, as further described hereinbelow.

Figure 4:
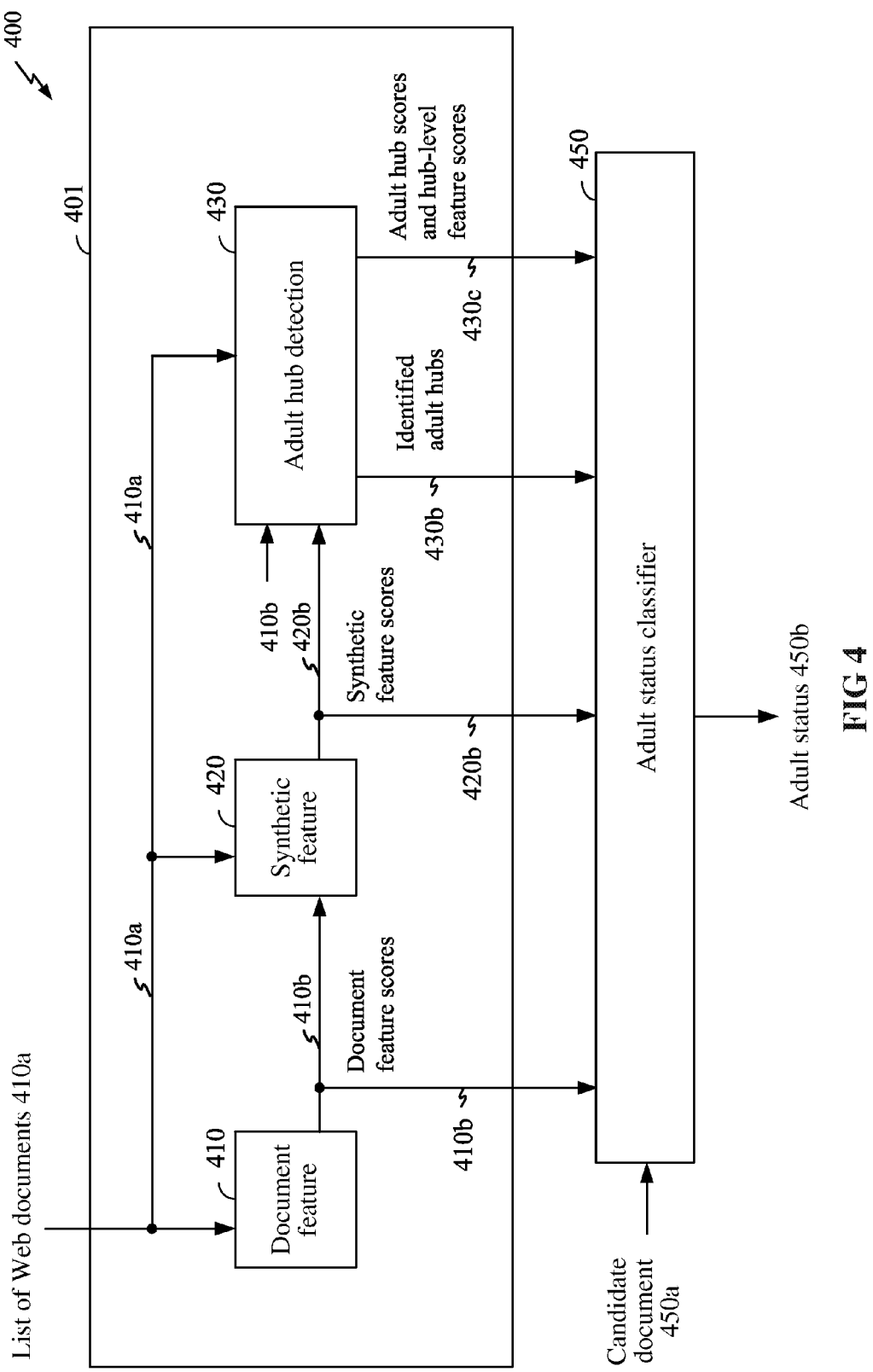
FIG. 4 illustrates an exemplary embodiment of a Web document classifier according to the present disclosure.

FIG. 4 illustrates an exemplary embodiment 400 of a Web document classifier according to the present disclosure. Note FIG. 4 is shown for illustrative purposes only, and is not meant to limit the scope of the present disclosure.

In FIG. 4, classifier 400 includes a mining/feature extraction module 401 and an adult status classifier block 450, also denoted herein as a "classifier block." Module 401 includes document feature block 410, synthetic feature block 420, and adult hub detection block 430.

Block 410 of module 401 receives as input a list 410a of Web documents for mining. In an exemplary embodiment, the process of "mining" may denote the application of data mining techniques to extract information about Internet websites, e.g., document content, network topology, etc. In an exemplary embodiment, such mining may typically be performed "offline," e.g., the results of the mining may be cumulative, and the response to a user search request may utilize information collected from websites cumulatively mined up to the time of search request input.

Block 410 outputs a list 410b of document feature scores, e.g., scores associated with a plurality of document-level features associated with each document in list 410a. In an exemplary embodiment, scores for such document-level features may be based on features extracted from each Web document in list 410a, indicative of whether such document contains explicit adult content.

In FIG. 4, synthetic feature block 420 receives as input list 410a and list 410b generated by block 410, and outputs a list 420b of synthetic feature scores. In an exemplary embodiment, a synthetic feature may include a combination of features (e.g., as provided in list 410b) aggregated across a plurality of Web documents, e.g., across all documents belonging to a single container, host, or domain.

In FIG. 4, adult hub detection block 430 receives as input the list 410a of Web documents, along with lists 410b, 420b generated by blocks 410, 420, respectively. Block 430 generates as output a list 430b of identified adult hubs, and a list 430c associating each identified adult hub in list 430b with an adult hub score and/or a plurality of hub-level feature scores. In particular, an adult hub score may indicate the confidence with which a corresponding hub is identified by block 430 as being an adult hub. Hub-level feature scores may further include, e.g., a breakdown of feature scores used in determining the corresponding score for each identified adult hub, and/or other feature scores relevant to the identified hub.

The lists of document feature scores 410b, synthetic feature scores 420b, identified adult hubs 430b, and associated adult hub scores 430c generated by module 401 are collectively provided to the classifier block 450 as inputs. Classifier block 450 classifies a candidate Web document 450a as adult or non-adult, and generates output signal 450b to indicate the classified adult status of candidate document 450a. In an exemplary embodiment, adult document status 450b may correspond to a "hard decision," e.g., a binary indicator of whether candidate document 450a is to be classified as adult or non-adult. In an alternative exemplary embodiment, adult document status 450b may further include "soft decision" metrics, e.g., indicating a degree of confidence with which the adult status of candidate document 450a is assigned by classifier 450.

Figure 5:
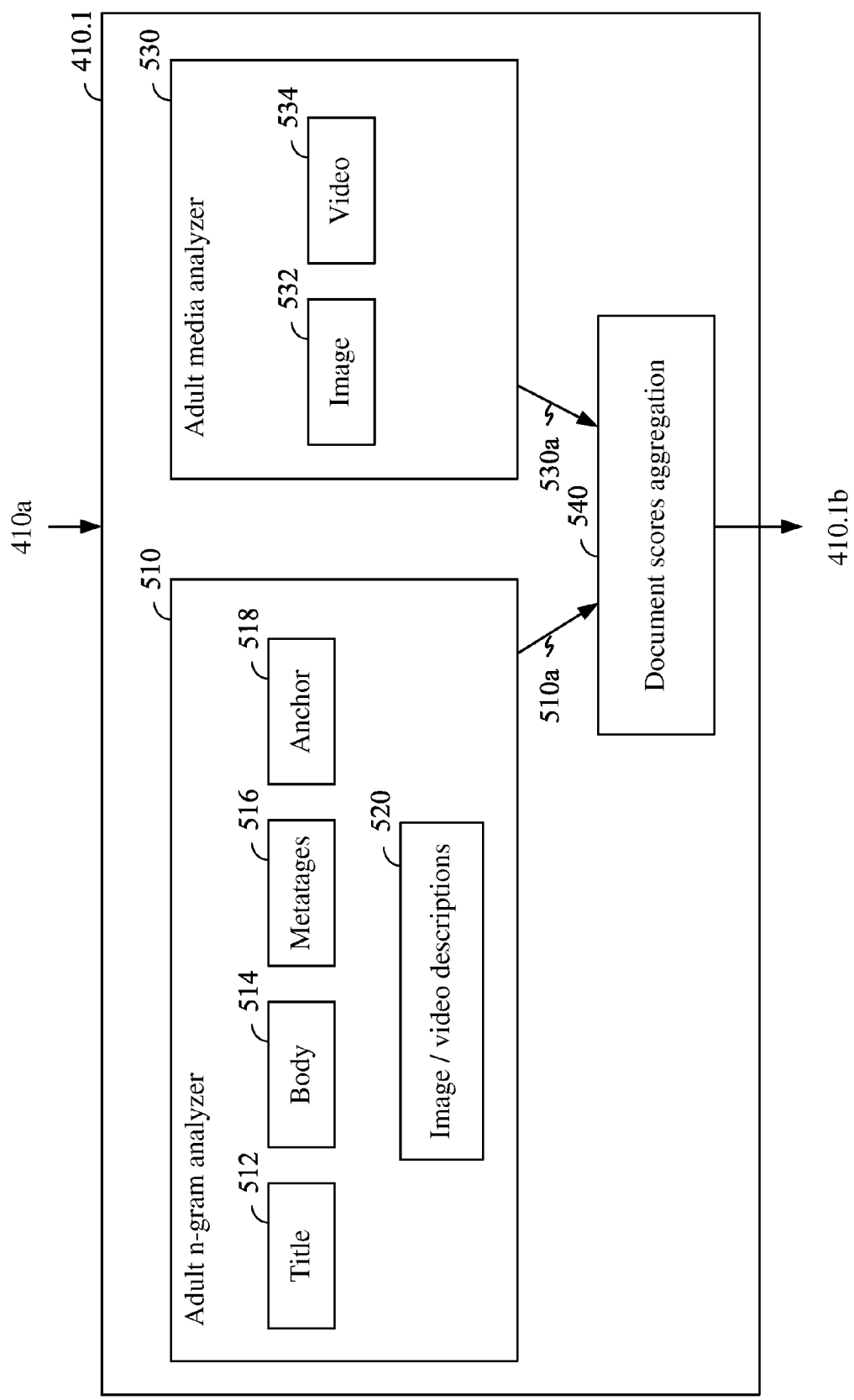
FIG. 5 illustrates an exemplary embodiment of a document feature block.

FIG. 5 illustrates an exemplary embodiment 410.1 of a document feature block 410. Note FIG. 5 is shown for illustrative purposes only, and is not meant to limit the scope of the present disclosure to implementations of a document feature block 410 as suggested by 410.1.

In FIG. 5, block 410.1 receives as input a list 410a of documents. For each document in list 410a, block 410.1 generates corresponding document-level feature scores. In particular, block 410.1 includes an n-gram analyzer 510 configured to detect the presence of n-gram text related to adult content. In an exemplary embodiment, n-gram analyzer 510 includes sub-modules 512, 514, 516, 518, 520. In particular, sub-module 512 analyzes the title of a Web document for adult n-gram content, sub-module 514 analyzes the body of a Web document, sub-module 516 analyzes metatags, sub-module 518 analyzes anchor text, and sub-module 520 analyzes image and/or video descriptions.

N-gram analyzer 510 generates as output a signal 510a containing the results of n-gram analysis performed on a Web document. In an exemplary embodiment, output signal 510a may be a vector signal, e.g., associating to each Web document in list 410a a plurality of computed feature scores indicating the presence and/or frequency of adult N-grams separately in the title, body, etc.

In an exemplary embodiment, block 410.1 may further include a media analyzer 530 configured to analyze media in the Web document to determine the presence of adult content. In an exemplary embodiment, media analyzer 530 includes image analyzer 532 and video analyzer 534, which may be configured to perform, e.g., skin-color pixel analysis on corresponding media in the Web document. Media analyzer 530 generates as output a signal 530a containing the results of media analysis performed on the Web document. In an exemplary embodiment, output signal 530a may be a vector signal, e.g., associating to each instance of media in a Web document a separate feature score indicating the likelihood of adult content being present.

In an exemplary embodiment, analysis of document content such as text and media may include identifying and counting (enumerating) the number of instances of an object of interest in a given document. For example, an "n-gram" analyzer may identify and count the number of instances of a given n-gram appearing in a given document. Analysis may further include other statistics relating to the presence of the object of interest, e.g., the layout distribution of pictures or videos throughout the body of a document (e.g., fewer instances near the top portion of a document), font (bold or italicized) of n-grams, etc. One of ordinary skill in the art will appreciate that any techniques known for document content analysis may be employed, and exemplary embodiments utilizing such analysis techniques are contemplated to be within the scope of the present disclosure.

In an exemplary embodiment, block 410.1 may further include a document score aggregation block 540 that combines the individual document-level feature scores. For example, in an exemplary embodiment, block 540 may weight and sum the individual document-level feature scores, e.g., feature scores in signals 510a, 530a, to generate a single aggregate score 410.1b for each Web document. In an exemplary embodiment, block 540 may further perform weighting of the individual signals before summing, e.g., according to weights chosen by a designer to emphasize de-emphasize certain of the feature scores in a resulting weighted sum constituting aggregate score 410.1b. Other alternative exemplary embodiments are also contemplated to be within the scope of the present disclosure, e.g., embodiments wherein the combination of scores is performed non-linearly or using any other combination techniques known in the art.

In an exemplary embodiment, output signal 410.1b of document feature block 410.1 may be a scalar quantity, e.g., signal 410.1b includes only a single aggregate score for each Web document analyzed, corresponding to the output of block 540 for that Web document. Generating a single aggregate score for each Web document may effectively save computational and storage resources for the system. Nevertheless, in certain exemplary embodiments (not shown), greater granularity of the document-level score may be provided by an implementation of block 410 by separately listing details for each Web document the sub-scores for each of several features analyzed by blocks 510, 530. In such cases, block 540 may be omitted altogether. It is noted that in certain implementations, increased visibility into the component feature scores of a single Web document may afford greater accuracy when the blocks are integrated with a classifier, e.g., if such component feature scores are combined with other types of non-document-level features. Such exemplary embodiments are contemplated to be within the scope of the present disclosure.

Figure 6:
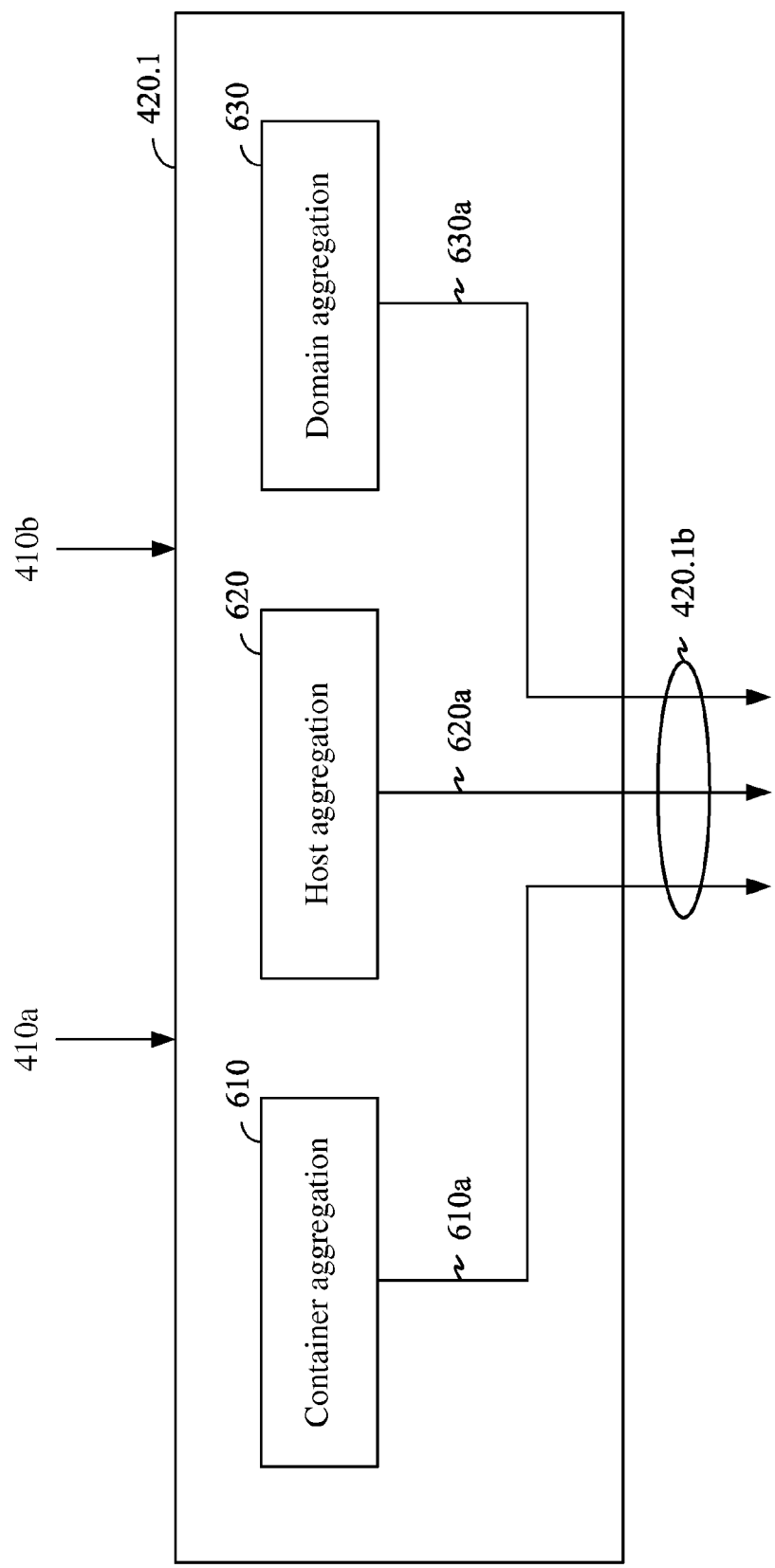
FIG. 6 illustrates an exemplary embodiment of a synthetic feature block.

FIG. 6 illustrates an exemplary embodiment 420.1 of a synthetic feature block 420. Note FIG. 6 is shown for illustrative purposes only, and is not meant to limit the scope of the present disclosure to implementations of synthetic feature block 420 shown.

In FIG. 6, block 420.1 receives as inputs the list of Web documents 410a and list of aggregate (e.g., vector) document-level scores 410b, e.g., as generated by block 410.1 described hereinabove. From these inputs, block 420.1 aggregates document-level scores across documents belonging to a single container, host, or domain. In particular, block 420.1 may include a container aggregation block 610 that determines which Web documents in 410a belong to the same container, and aggregates the document-level scores in 410b corresponding to those documents to generate an aggregate container-level score or vector 610a. Similarly, block 420.1 may include a host aggregation block 620 that aggregates document-level scores 410b for Web documents belonging to the same host to generate a single aggregate host-level score 620a, and a domain aggregation block 630 that aggregates document level scores 410b for Web documents belonging to the same domain to generate a single aggregate domain-level score 630a. In an exemplary embodiment, "named feature vectors" may be provided to distinguish among document-level, host-level, or domain-level scores. For example, feature vectors HostAggregationFV, DomainAggregationFV, and ContainerAggregationFV may be provided, wherein each feature vector refers to the same features, but such features are associated with different feature scores depending on the aggregation level.

In an exemplary embodiment, synthetic feature block 420.1 generates an instance 420.1b of output signal 420b that is a vector quantity, e.g., signal 420.1b includes multiple sub-signals 610a, 620a, 630a corresponding to separate containers, hosts, and domains. In alternative exemplary embodiments, any of sub-signals 610a, 620a, 630a may be omitted from signal 420.1b, and additional sub-signals (not shown) corresponding to other document groups may be further provided in signal 420.1b.

Figure 7A:
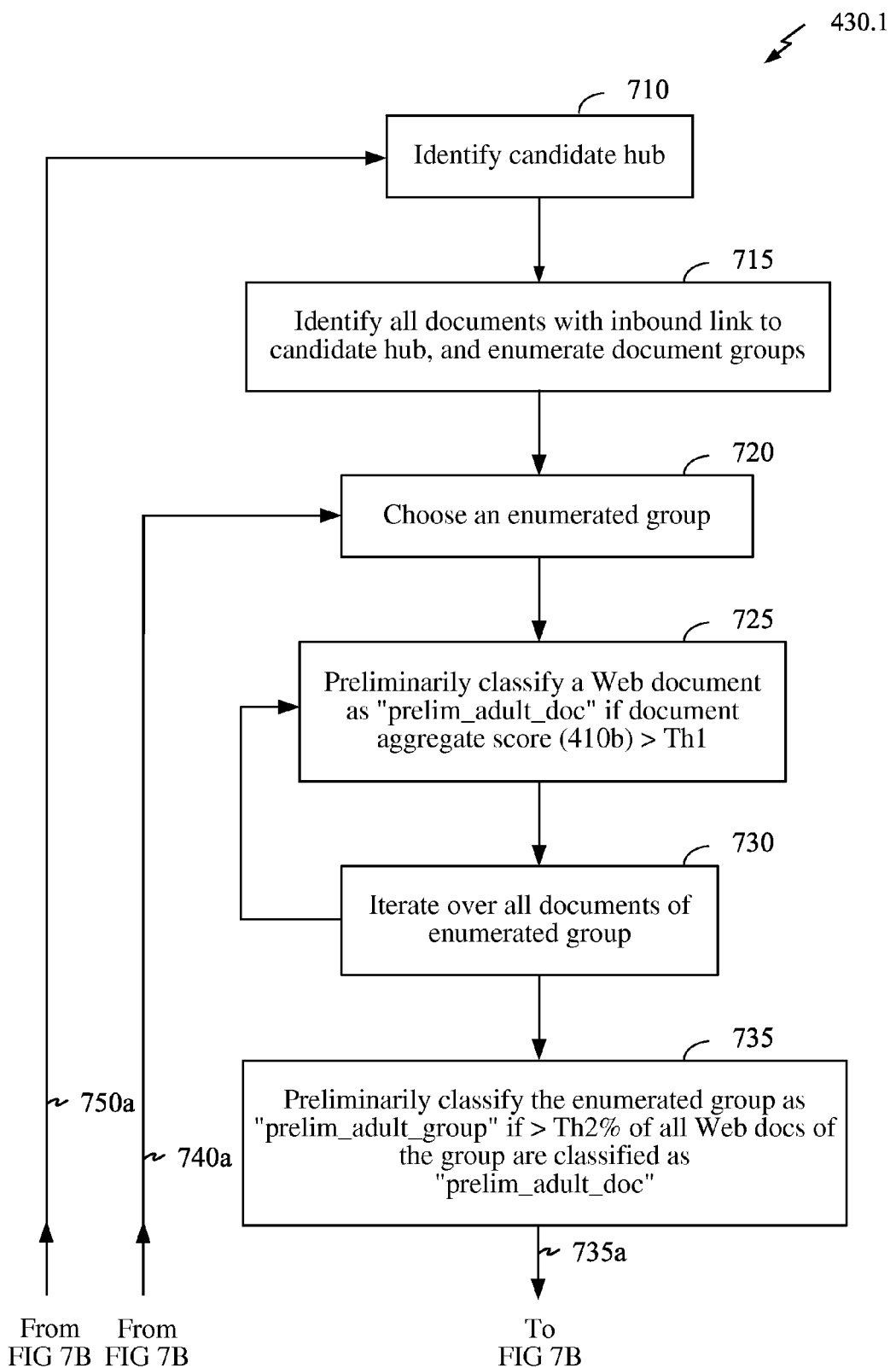
FIGS. 7A and 7B illustrate an exemplary embodiment of techniques for implementing an adult hub detection block.
Figure 7B:
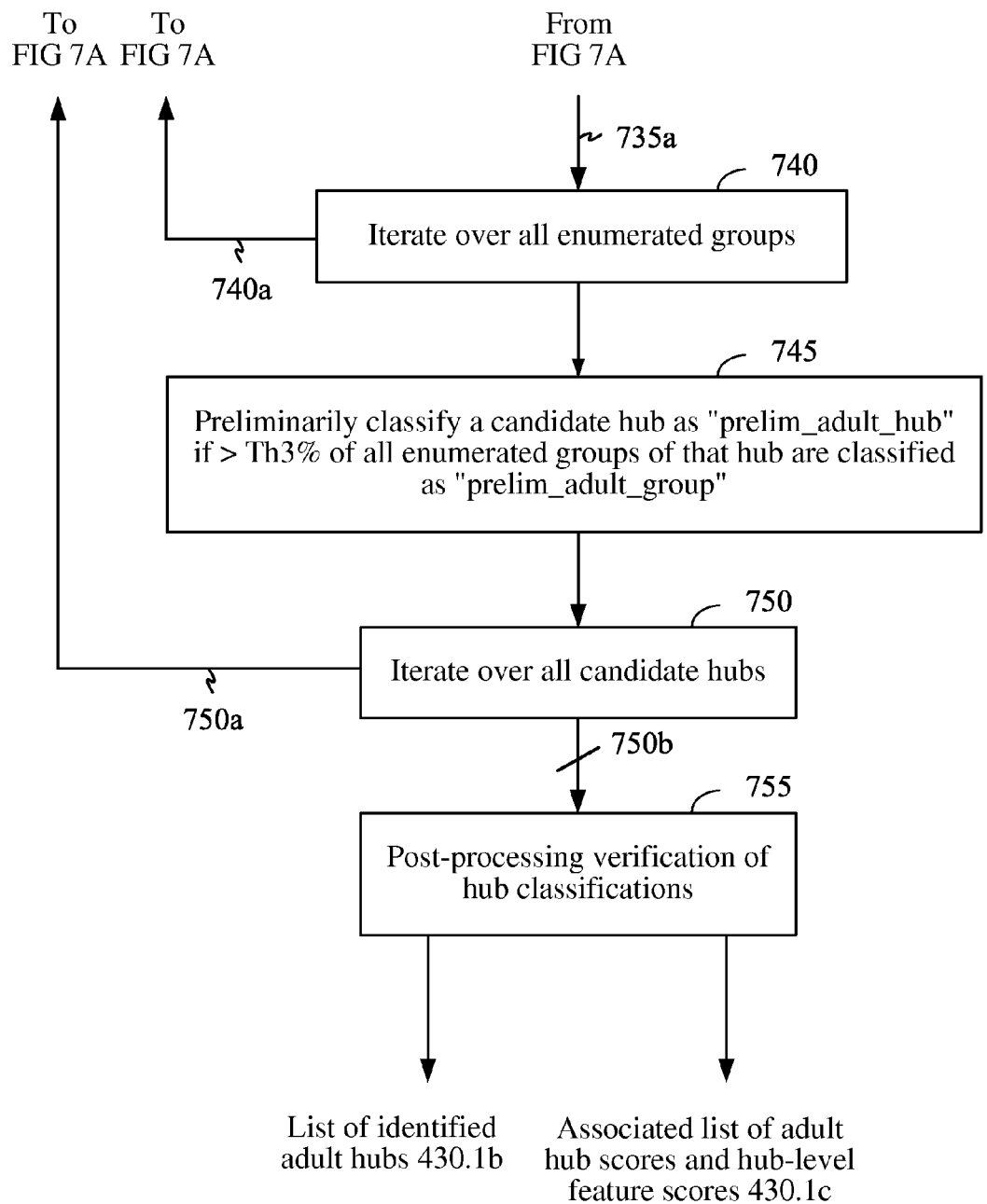

FIGS. 7A and 7B illustrate an exemplary embodiment 430.1 of techniques for implementing adult hub detection block 430. Note FIGS. 7A and 7B are shown for illustrative purposes only, and are not meant to limit the scope of the present disclosure.

In FIG. 7A, at block 710, at least one candidate hub is identified from the plurality of Web documents to be mined. In an exemplary embodiment, initial candidate hubs may at least partially be identified based on "seed hubs" known by designers of the system to correspond to adult hubs. Seed hubs may include, e.g., payment processing sites, advertising network sites, etc., known a priori to provide service to Internet adult websites. During the process of mining Web documents, e.g., identifying new Web documents and determining their mutual inbound and outbound link relationships as suggested by FIG. 3, additional Web documents may be classified as candidate adult hubs to be included at block 710.

At block 715, for each candidate hub, all Web documents having inbound links to the candidate hub are identified. Further at block 715, the Web documents so identified are further categorized by document group. For example, all identified documents corresponding to the same container may be categorized into a document group. Alternatively, all identified documents corresponding to the same host, domain, or any other collection of documents, may be categorized into a document group. The various document groups corresponding to the identified Web documents are enumerated, and further denoted herein as "enumerated groups."

At block 720, one of the groups enumerated at block 715 is chosen for further processing.

At block 725, a Web document corresponding to the group chosen at block 720 is preliminarily classified as being of type "prelim_adult_doc," if some predetermined condition is met. In an exemplary embodiment, the predetermined condition may correspond to an aggregate score for that Web document exceeding a first predetermined threshold Th1. In an exemplary embodiment, the aggregate score for a Web document may be calculated according to, e.g., techniques described with reference to the calculation of signal 410.1b in FIG. 5 hereinabove. In alternative exemplary embodiments, the aggregate score for a Web document may be calculated using alternative techniques. Block 725 may also be denoted herein as a "preliminary adult document classifier block."

At block 730, the operation of block 725 is re-iterated over all Web documents associated with the group chosen at block 720.

At block 735, the group chosen at block 720 is preliminarily classified as being of type "prelim_adult_group," if a predetermined condition is met. In an exemplary embodiment, the predetermined condition may correspond to at least a predetermined percentage, e.g., Th2%, of all the group's Web documents being classified as "prelim_adult_doc" at block 725. Block 735 may also be denoted herein as a "preliminary adult group classifier block."

In FIG. 7B, at block 740 following block 735, operation returns to block 715, following arrow 740a back to block 715 of FIG. 7A. In particular, this iterates the operations of blocks 720-735 over all groups enumerated at block 715.

At block 745, the candidate hub identified at block 710 is preliminarily classified as being of type "prelim_adult_hub" if a predetermined condition is met. In an exemplary embodiment, the predetermined condition may correspond to at least a predetermined percentage, e.g., Th3%, of all document groups associated with the candidate hub having previously been classified as "prelim_adult_group" at block 735. Block 745 may also be denoted herein as a "hub candidate classifier block." The percentage of all document groups associated with the candidate hub that are classified as "prelim_adult_group" is also denoted herein as an "adult hub score."

At block 750, operation returns to block 710, following arrow 750a back to block 710 of FIG. 7A. In particular, this iterates the operations of blocks 710-745 over all candidate hubs. In an exemplary embodiment, a signal 750b including a list of candidate hubs and associated adult hub scores is generated, and provided to block 755 for further processing.

At block 755, post-processing verification of hub classifications is selectively performed. In particular, the classification by blocks 710-750 of a given Web document, whether as being of type "prelim_adult_hub" or not, may be verified for accuracy. In an exemplary embodiment, an adult hub score associated with a candidate hub may be used as a measure of the confidence in the corresponding classification of that candidate hub. For example, the adult hub score being less than a certain threshold, e.g., Th4, may indicate that the classification should be verified using additional techniques. Block 755 generates as output a list 430.1b of identified adult hubs, and an associated list 430.1c of adult hub scores and hub-level feature scores.

In an exemplary embodiment, hub classifications may be verified by leveraging crowd-sourcing judgment of certain adult hub classifications. For example, if the aggregate hub score for a candidate hub classified as "prelim_adult_hub" is less than a certain threshold, then a system may utilize crowd-sourcing techniques, e.g., eliciting the judgment of Internet users to further aid in the classification. In an alternative exemplary embodiment, verification of adult hub status may be alternatively or additionally performed by such Internet users.

In an exemplary embodiment, during verification at block 755, candidate hubs may further be classified according to a service type provided by the candidate hub. For example, certain preliminarily classified candidate hubs may further be classified as "billing provider" hubs using document-level analysis of the candidate hub webpages. In an exemplary embodiment, certain text relevant to providing billing service may be detected in a preliminarily classified candidate hub that is also a billing hub. Such text may include, e.g., "credit card processing solutions," "credit card processing," etc. In an exemplary embodiment, a weighted sum for a preliminary hub may be formed by weighting such instances of service-specific text by relevancy factors. Such techniques may increase the confidence that a preliminary classification of a candidate document as a candidate hub is correct.

Figure 8:
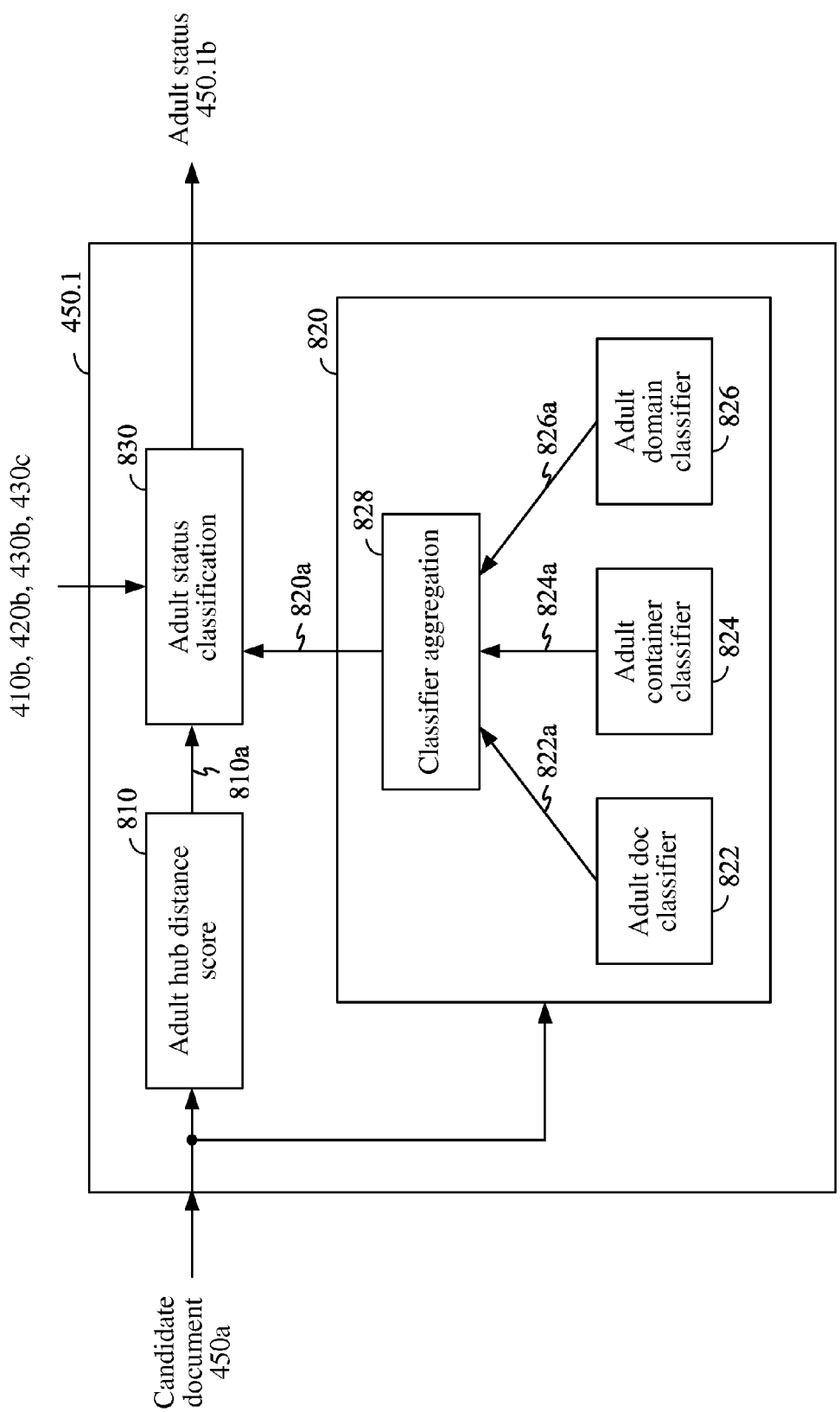
FIG. 8 illustrates an exemplary embodiment of adult status classifier.

FIG. 8 illustrates an exemplary embodiment 450.1 of adult status classifier 450. Note FIG. 8 is shown for illustrative purposes only, and is not meant to limit the scope of the present disclosure to any particular implementations of adult status classifiers.

In FIG. 8, adult status classifier 450.1 receives as input signals 410b, 420b, 430b, 430c, e.g., each signal as described hereinabove with reference to FIG. 4. Note such input signals 410b, 420b, 430b, 430c may be those associated with all or a specific subset of the documents mined, e.g., as list 410a of Web documents. Furthermore, classifier 450.1 receives as input a candidate document 450a, whose adult status is to be determined and output by classifier 450.1 as signal 450.1b. In an exemplary embodiment, adult status 450.1b may include a simple binary indication of whether candidate document 450a is adult or non-adult, as classified by classifier 450.1. In alternative exemplary embodiments, adult status 450.1b may further include other metrics, such as the degree of confidence of the corresponding classification, etc.

Classifier 450.1 includes an adult hub distance score calculation block 810. Block 810 is configured to generate a hub distance metric 810a indicative of the degree to which the candidate document 450a belongs to one or more identified adult hubs. For example, when candidate document 450a is directly linked to an identified adult hub, e.g., a hub identified in list 430b as described hereinabove, then the metric 810a may indicate a high degree of association with that hub. Alternatively, if candidate document 450a is linked to the hub indirectly, e.g., via two or more hops, then the metric 810a may indicate a lesser degree of association with that hub.

Note in this specification and in the claims, a "hop" may denote a direct connection from one Web document to another, with the total number of hops between two documents being termed a "hop distance." For example, assume a document with URL http://a.com/1.html links to another document http://b.com/2.html, which in turn links to another document http://c.com/3.html. Then the hop distance between a.com/1.html and b.com/2.html is one hop, and the hop distance between b.com/2.html and c.com/3.html is also one hop. Furthermore, the hop distance between a.com/1.html and c.com/3.html is two hops.

In an exemplary embodiment, metric 810a may assign a code indicating the number of hops, or hop distance, between a candidate document 450a and the hub closest to candidate document 450a in list 430b, also as measured by hop distance.

In an exemplary embodiment, the topology of the web graph for each document may be utilized to derive an appropriate hub distance metric 810a. For example, cross-domain connections may be weighted less than hub connections from the same domain. In general, links coming from external sites (e.g., external domains, hubs, or containers) provide different type of information than links coming from internal sites, and therefore it may increase classification accuracy to score "internal" and "cross-domain" connections differently.

In alternative exemplary embodiments, metric 810a may further be based on adult hub scores, e.g., as provided in list 430c associated with list 430b as described hereinabove. For example, metric 810 may more heavily weight a link to an identified hub in list 430b if an associated hub-level score for that hub is higher. In an exemplary embodiment, metric 810 may be calculated, e.g., according to a weighted summation formula, e.g., weighting the number of hops between candidate document 450a and a hub in list 430b by a hub-level score of that hub in list 430c, up to some predetermined number of hubs. In alternative exemplary embodiments, other types of weighting and combination techniques, e.g., non-linear weighting and combination, may be performed alternatively to or in conjunction with linear weighted summation. Such alternative exemplary embodiments are contemplated to be within the scope of the present disclosure.

Classifier 450.1 further includes a candidate document feature block 820. Block 820 includes adult document classifier 822, adult container classifier 824, and adult domain classifier 826.

Adult document classifier 822 may generate one or more document-level metrics 822a indicating the presence of adult content in candidate document 450a. Such metrics include, e.g., n-gram scores for known adult text detected as being present in candidate document's text fields. In an exemplary embodiment, similar techniques may be adopted as those used for deriving document feature scores 410b, e.g., as described hereinabove with reference to FIG. 4.

Adult container classifier 824 may generate one or more container-level metrics 824a indicating the presence of adult content in the container to which candidate document 450a belongs. Such metrics include, e.g., average number of documents in a container marked editorially as adult, total number of adult images found in the container, total number of adult videos found in the container, total number of adult words found in the container, average number of adult documents returned in queries returning results from the same container, etc.

Adult domain classifier 826 may generate one or more domain-level metrics 826a indicating the presence of adult content in the web domain to which candidate document 450a belongs. Such metrics may include similar metrics to those used for containers, as enumerated above for exemplary purposes.

In an exemplary embodiment, explicit instances of classifiers 822, 824, 826 may be omitted, and the corresponding metrics 822a, 824a, 826a may instead be derived from the signals 410b, 420b, 430b, 430c generated by the mining/feature extraction module 401. In such an exemplary embodiment, candidate document 450a may already be present in the list of mined documents 410a. Such exemplary embodiments are contemplated to be within the scope of the present disclosure.

Candidate document feature block 820 further includes a classifier aggregation block 828, which aggregates all the metrics present in metrics 822a, 824a, 826a to generate a classifier metric 820a for output by block 820. Note metric 820a may generally be a scalar or vector quantity, and may also be denoted herein as a "document score." In an exemplary embodiment, metric 820a may be calculated as a weighted sum of the metrics 822a, 824a, 826a, with each component of the weighted sum being multiplied by a weight chosen by system designers for optimum classification accuracy. In alternative exemplary embodiments, metric 820a may instead be a simple sum of metrics 822a, 824a, 826a, or metric 820a may weight or combine any or all of metrics 822a, 824a, 826a non-linearly using any techniques known in the art for data combination. In certain exemplary embodiments, a simple sum may nevertheless incorporate metric weighting, e.g., if any of blocks 822, 824, 826 individually pre-weights its output metric 822a, 824a, 826a prior to providing to the classifier aggregation block 828. In yet alternative exemplary embodiments, classifier aggregation block 828 may be omitted, and metric 820a may be a vector that includes the full content of individual metrics 822a, 824a, 826a. Such alternative exemplary embodiments are contemplated to be within the scope of the present disclosure.

The output 820a of block 820 is provided to an adult status classification block 830, which combines metric 820a with hub distance metric 810a and any or all of metrics 410b, 420b, 430b, 430c to generate an overall adult status classification 450.1b. In an exemplary embodiment, block 830 may implement classification algorithms derived offline for assigning adult status 450.1b to a candidate document 450a given a particular combination of signals 810a and 820a. For example, machine learning techniques may be utilized to program such an algorithm by, e.g., providing a comprehensive list of reference training documents 450a\* to block 450.1, along with a corresponding refereed list of reference adult status classifications 450.1b\*, e.g., reference classifications made by human judges during a training phase. Based on these sets of training data, an appropriate algorithm, e.g., having an appropriate set of coefficients, may be derived for block 830 to minimize the difference between classified adult status 450.1b and reference adult status classifications 450.1b\*.

In certain exemplary embodiments, in addition to a machine learning algorithm trained as described hereinabove, block 830 incorporates human or crowd-sourced editorial input that may augment or override the adult status classification as assigned by a machine algorithm. In such exemplary embodiments, the final adult status classification 450.1b may be subject to override or augmentation by such human or crowd-sourced authority. Such alternative exemplary embodiments are contemplated to be within the scope of the present disclosure.

It will be appreciated that other signals besides the metrics 822a, 824a, 826a shown in FIG. 8 may readily be incorporated with other aspects of the present disclosure. For example, search-based log information, co-clicks and co-impression of other adult documents, and similar signals related to each candidate Web document may also be generated by a sub-block (not shown) within block 820, and/or aggregated by classifier aggregation 828. In an exemplary embodiment, block 828 may be implemented as a heuristic rule-based engine allowing combination of the decisions of 822a, 824a, 826a, or as an "ensemble" classifier that could differently weight the three decisions based on importance. Such alternative exemplary embodiments are contemplated to be within the scope of the present disclosure.

Figure 9:
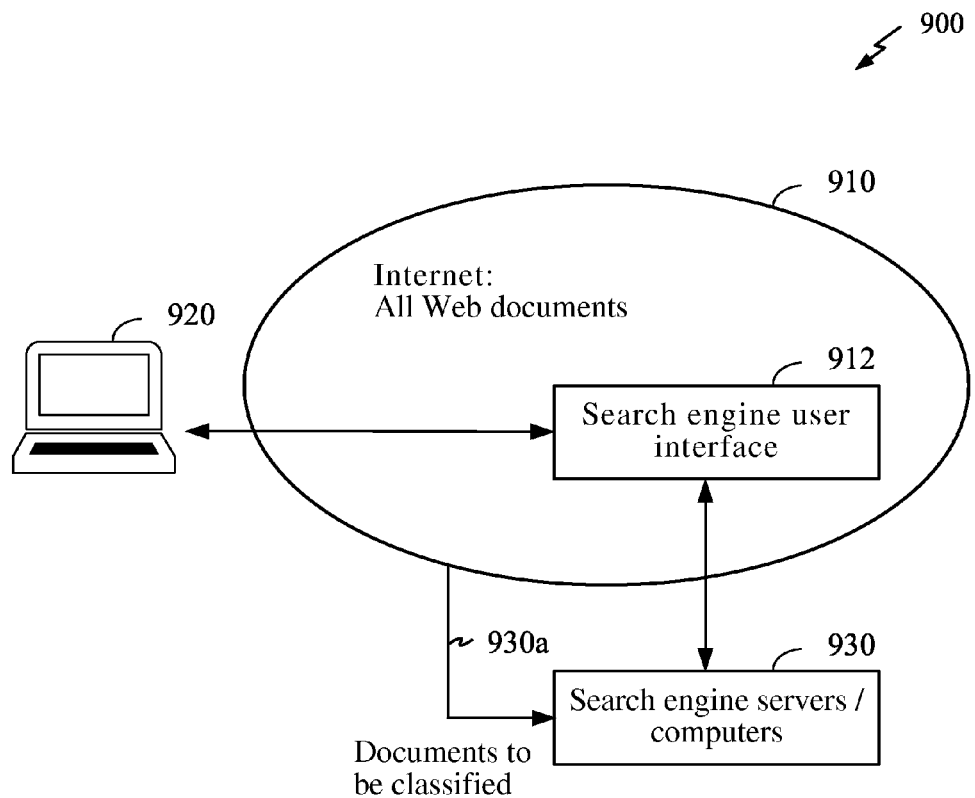
FIG. 9 illustrates an exemplary embodiment of a search engine system incorporating techniques of the present disclosure.

FIG. 9 illustrates an exemplary embodiment 900 of a search engine system incorporating techniques of the present disclosure. Note FIG. 9 is shown for illustrative purposes only, and is not meant to limit the scope of the present disclosure to the search engine system 900 shown. In alternative exemplary embodiments, techniques of the present disclosure may be applied to identify adult content in other types of systems, e.g., search engines for non-Internet documents such as available on a private network or Intranet. Such alternative exemplary embodiments are contemplated to be within the scope of the present disclosure.

In FIG. 9, a user (not shown) uses a personal computing device 920 to submit a search query to a search engine on the Internet 910. Note personal computing device 920 may include any type of device for submitting search queries, e.g., personal computers, notebooks, smartphones, or other such devices. The chosen search engine has an Internet user interface 912, which accepts the query information from the user. The query information is transferred to back-end search engine servers/computers 930 for processing. Upon completion of processing, servers/computer 930 returns a listing of relevant search results to the requesting device 920 via the search engine user interface 912.

In an exemplary embodiment, the techniques disclosed hereinabove for adult content identification, e.g., with reference to FIGS. 4-8 hereinabove, may be implemented on search engine servers/computers 930 to remove content classified as adult from the search results returned. For example, servers/computers 930 may include general-purpose hardware for executing software instructions for implementing the techniques described hereinabove. In alternative exemplary embodiments, servers/computers 930 may include dedicated hardware specifically designed for implementing the techniques described hereinabove. In yet alternative exemplary embodiments, servers/computers 930 may further accept editorial input from human judges or crowd-sourced judgments to classify documents 930a. Such alternative exemplary embodiments are contemplated to be within the scope of the present disclosure.

In an exemplary embodiment, servers/computers 930 may mine documents to be classified 930a from the Internet 910 off-line, e.g., prior to any user submitting search queries. In this manner, the classification of certain documents in 930a as being adult may be performed prior to user search queries, decreasing the response time of the search engine in delivering search results responsive to the user query, thereby enhancing user experience.

Figure 10:
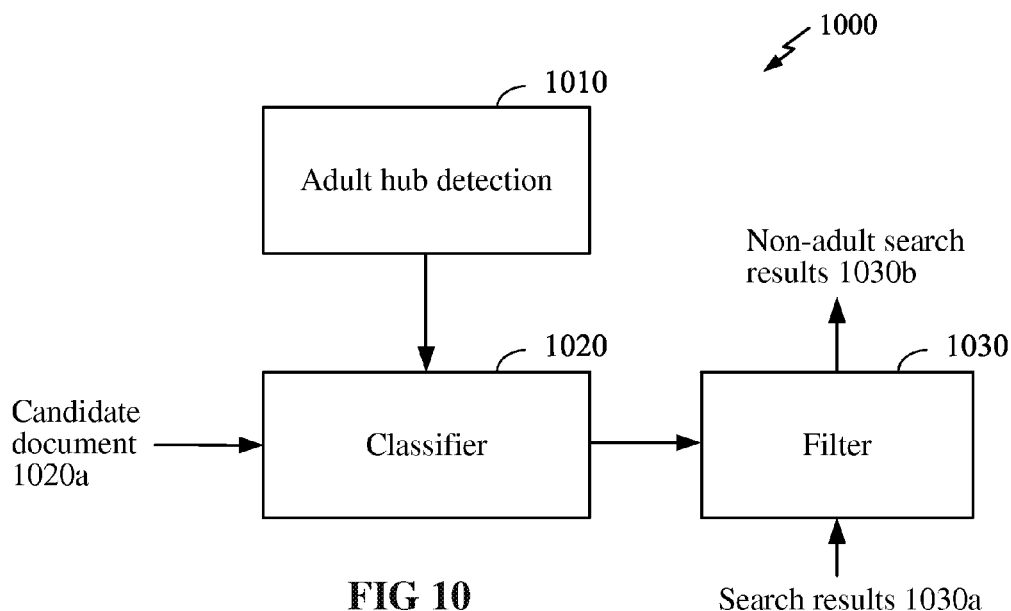
FIG. 10 illustrates an exemplary embodiment of an apparatus according to the present disclosure.

FIG. 10 illustrates an exemplary embodiment 1000 of a search engine apparatus for responding to a search query according to the present disclosure. Note FIG. 10 is shown for illustrative purposes only, and is not meant to limit the scope of the present disclosure to any particular apparatus shown.

In FIG. 10, the apparatus 1000 includes an adult hub detection block 1010 configured to calculate a hub score for an adult hub, wherein the adult hub is connected to a plurality of adult documents. Apparatus 1000 further includes a classifier block 1020 comprising a candidate document feature block configured to calculate a document score for a candidate document 1020a. In an exemplary embodiment, the classifier block 1020 is configured to classify the candidate document as adult based on inputs comprising the document score of the candidate document and the hub score.

In an exemplary embodiment, adult hub detection block 1010 may substantially perform the functionality described with reference to block 430 in FIG. 4 and/or block 430.1 in FIG. 7. In an exemplary embodiment, classifier block 1020 may perform substantially the functionality described with reference to block 450 in FIG. 4 and/or block 450.1 in FIG. 8.

Apparatus 1000 further includes a filter block 1030 configured to remove any candidate document classified as adult from search result responses 1030a to the search query to generate non-adult search results 1030b. In an exemplary embodiment, search result responses 1030a may be generated using any known techniques for identify and ranking documents relevant to a search query.

Figure 11:
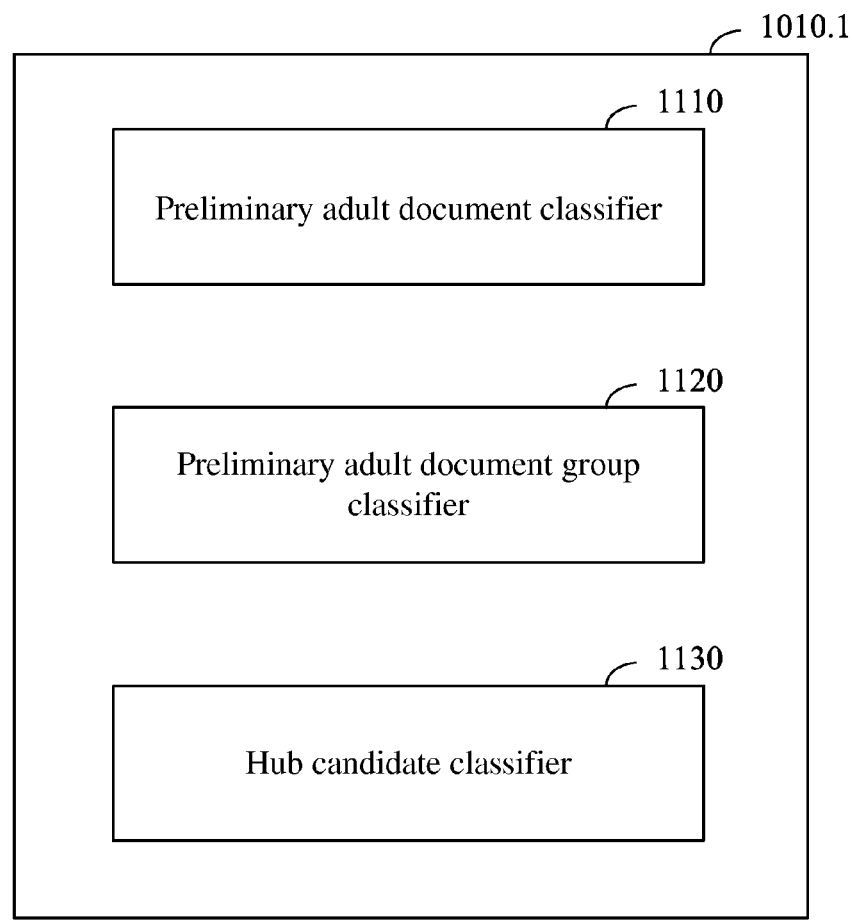
FIG. 11 illustrates an exemplary embodiment of an adult hub detection block according to the present disclosure.

FIG. 11 illustrates an exemplary embodiment 1010.1 of an adult hub detection block 1010 according to the present disclosure. Note FIG. 11 is shown for illustrative purposes only, and is not meant to limit the scope of the present disclosure.

In FIG. 11, adult hub detection block 1010.1 includes a preliminary adult document classifier block 1110, a preliminary adult group classifier block 1120, and a hub candidate classifier block 1130. In an exemplary embodiment, block 1110 is configured to classify a document as a preliminary adult document if the corresponding document score exceeds a first threshold. Block 1120 is configured to classify an adult document group as a preliminary adult group if the number of preliminary adult documents divided by a total number of documents associated with the group exceeds a second threshold. Block 1130 is configured to classify a candidate hub as an adult hub if the number of preliminary adult groups divided by a total number of groups associated with the candidate hub exceeds a third threshold.

In an exemplary embodiment, the operations performed at block 1110 may correspond to blocks 725-730 described hereinabove with reference to FIG. 7. Furthermore, the operations performed at block 1120 may correspond to block 730, and operations performed at block 1130 may correspond to block 745 of FIG. 7.

Figure 12:
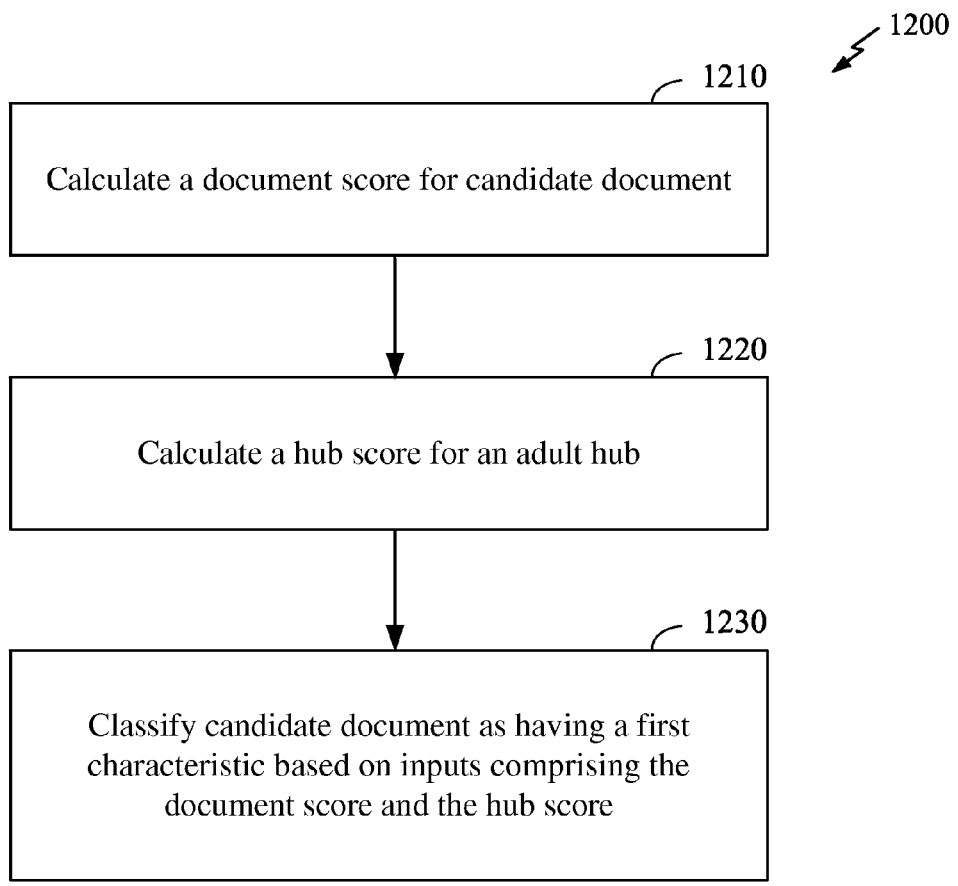
FIG. 12 illustrates an exemplary embodiment of a method according to the present disclosure.

FIG. 12 illustrates an exemplary embodiment 1200 of a method according to the present disclosure. Note FIG. 12 is shown for illustrative purposes only, and is not meant to limit the scope of the present disclosure to any particular method shown.

In FIG. 12, block 1210 includes calculating a document score for each of a plurality of documents in a network, said plurality of documents comprising the candidate document and at least one document connected to the candidate document in the network. Block 1220 includes calculating a hub score for an adult hub, wherein the adult hub is connected to at least a plurality of the plurality of documents in the network. Block 1230 includes classifying the candidate document as adult based on inputs comprising the document score of the candidate document and the hub score.

Figure 13:
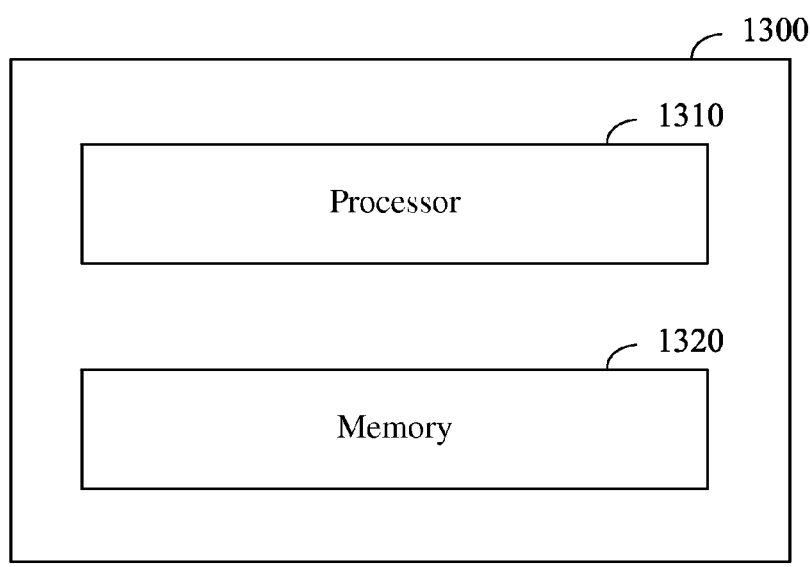
FIG. 13 schematically shows a non-limiting computing system that may perform one or more of the above described methods and processes.

FIG. 13 schematically shows a non-limiting computing system 1300 that may perform one or more of the above described methods and processes. Computing system 1300 is shown in simplified form. It is to be understood that virtually any computer architecture may be used without departing from the scope of this disclosure. In different embodiments, computing system 1300 may take the form of a mainframe computer, server computer, cloud computing system, desktop computer, laptop computer, tablet computer, home entertainment computer, network computing device, mobile computing device, mobile communication device, smartphone, gaming device, etc.

Computing system 1300 includes a processor 1310 and a memory 1320. Computing system 1300 may optionally include a display subsystem, communication subsystem, sensor subsystem, camera subsystem, and/or other components not shown in FIG. 13. Computing system 1300 may also optionally include user input devices such as keyboards, mice, game controllers, cameras, microphones, and/or touch screens, for example.

Processor 1310 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 1320 includes one or more physical devices configured to hold data and/or instructions executable by the processor to implement the methods and processes described herein. When such methods and processes are implemented, the state of memory 1320 may be transformed (e.g., to hold different data). Memory 1320 may include removable media and/or built-in devices, such as computer-readable storage media. Memory 1320 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1320 may include devices with one or more of the following characteristics: volatile, nonvolatile, dynamic, static, read/write, read-only, random access, sequential access, location addressable, file addressable, and content addressable. In some embodiments, processor 1310 and memory 1320 may be integrated into one or more common devices, such as an application specific integrated circuit or a system on a chip.

It is to be appreciated that memory 1320 includes one or more physical devices that stores information. The terms "module," "program," and "engine" may be used to describe an aspect of computing system 1300 that is implemented to perform one or more particular functions. In some cases, such a module, program, or engine may be instantiated via processor 1310 executing instructions held by memory 1320. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In an aspect, computing system 1300 may correspond to a computing device including a memory 1320 holding instructions executable by a processor 1310 to calculate a hub score for an adult hub, wherein the adult hub is connected to a plurality of documents, calculate a document score for the candidate document, and classify the candidate document as having a first characteristic based on inputs comprising the document score of the candidate document and the hub score.

Figure 14:
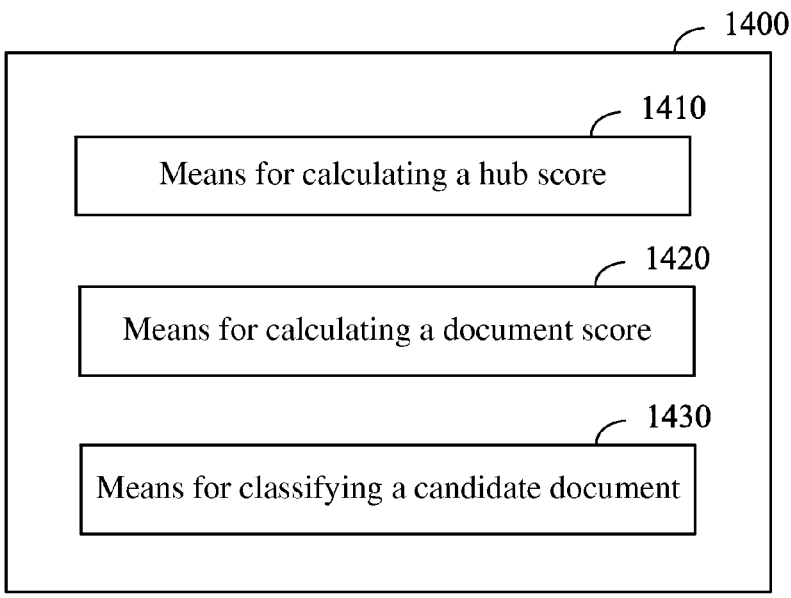
FIGS. 14 and 15 illustrate alternative exemplary embodiments of a search engine apparatus according to the present disclosure.

FIG. 14 illustrates an alternative exemplary embodiment of a search engine apparatus according to the present disclosure. In FIG. 14, search engine apparatus 1400 for classifying a candidate document includes means 1410 for calculating a hub score for a hub document, wherein the hub document is connected to a plurality of documents. Apparatus 1400 further includes means 1420 for calculating a document score for the candidate document, and means 1430 for classifying the candidate document as having a first characteristic based on inputs comprising the document score of the candidate document and the hub score. In an exemplary embodiment, the first characteristic corresponds to adult status. In alternative exemplary embodiments, the first characteristic may correspond to, e.g., other characteristics of a type desired to be identified by the system, e.g., documents related to potentially offensive content, or any characteristics of documents sharing information via connections found between hubs of documents.

Figure 15:
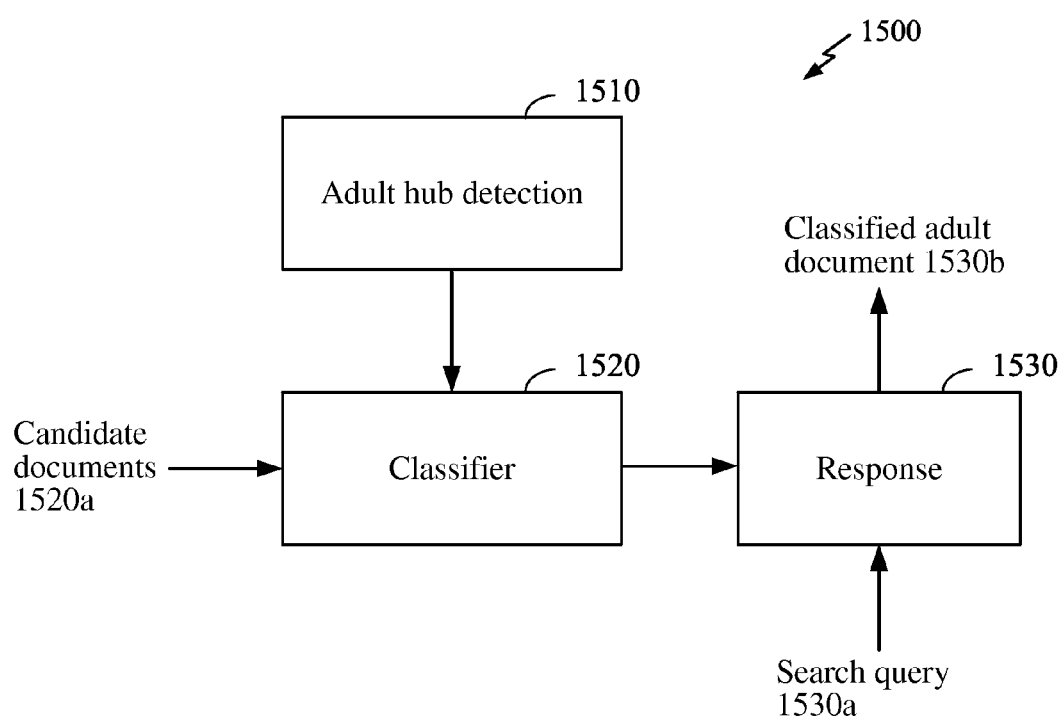

Techniques of the present disclosure may also be applied to classify documents in response to explicit search requests for adult content. FIG. 15 illustrates an alternative exemplary embodiment of a search engine apparatus for responding to a search query 1530a according to the present disclosure. Note FIG. 15 is shown for illustrative purposes only, and is not meant to limit the scope of the present disclosure to any particular apparatus shown.

In FIG. 15, the apparatus 1500 includes an adult hub detection block 1510 configured to calculate a hub score for an adult hub, wherein the adult hub is connected to a plurality of adult documents. Apparatus 1500 further includes a classifier block 1520 comprising a candidate document feature block configured to receive a plurality of candidate documents 1520a and calculate a document score for each candidate document. In an exemplary embodiment, the classifier block 1520 is configured to classify an adult status of each candidate document based on inputs comprising the document score of the candidate document and the hub score.

Apparatus 1500 further includes a response block 1530 configured to return a candidate document 1530ba classified as adult in response to search query 1530a, wherein the search query comprises a query for adult content. In an exemplary embodiment, response block 1530 is further configured to rank the plurality of candidate documents classified as adult using a composite score based on said inputs, and to display the plurality of candidate documents in sequence according to rank based on the composite score. In an exemplary embodiment, the composite score may be based on, e.g., such other metrics as included in the adult status 450.1b shown in FIG. 8, e.g., indicating degree of confidence in the classification of a document as adult, etc. Further techniques known in the art for identifying Web content relevant to a search query, and/or for ranking the relevance of such Web content to the search query, may readily be adopted in exemplary embodiments of classifier 1520 and response block 1530. Such exemplary embodiments are contemplated to be within the scope of the present disclosure.

An aspect of the present disclosure provides a search engine apparatus for responding to a search query, the search engine apparatus comprising: an adult hub detection block configured to calculate a hub score for an adult hub, wherein the adult hub is connected to a plurality of documents; a classifier block comprising a candidate document feature block configured to calculate a document score for the candidate document, the classifier block configured to classify the candidate document as adult based on inputs comprising the document score of the candidate document and the hub score; and a filter block configured to remove any candidate document classified as adult from responses to the search query. In an exemplary embodiment, the apparatus further comprises: a document feature block configured to calculate a document-level score for each of a plurality of documents in the network, said plurality of documents comprising at least one document connected to the candidate document in the network; and a synthetic feature block configured to calculate at least one synthetic score for each of a plurality of document groups associated with the plurality of documents in the network, each synthetic score comprising an aggregation of a plurality of document scores.

Another aspect of the present disclosure provides a method for classifying a candidate document using a search engine, the method comprising: calculating a hub score for an adult hub, wherein the adult hub is connected to a plurality of adult documents; calculating a document score for the candidate document; and classifying the candidate document as adult based on inputs comprising the document score of the candidate document and the hub score. In an exemplary embodiment, the calculating the document score comprises: counting a number of occurrences of target n-grams in any text portion of the candidate document; weighting each counted number by a target n-gram weighting factor; and aggregating the weighted numbers to generate the document score.

Yet another aspect of the present disclosure provides a search engine apparatus for responding to a search query, the search engine apparatus comprising: an adult hub detection block configured to calculate a hub score for an adult hub, wherein the adult hub is connected to a plurality of documents; a classifier block comprising a candidate document feature block configured to receive a plurality of candidate documents, and calculate a document score for each candidate document, the classifier block configured to classify an adult status of each candidate document based on inputs comprising the document score of each candidate document and the hub score; and a response block configured to return a candidate document classified as adult as a response to the search query, wherein the search query comprises a query for adult content. In an exemplary embodiment, the response block is further configured to rank a plurality of candidate documents classified as adult using a composite score based on said inputs, and to display the plurality of candidate documents in sequence according to rank based on the composite score.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A search engine apparatus for generating a plurality of responses to a search query submitted to an online search engine, the search engine apparatus comprising computer hardware for executing:
   an adult hub detection block configured to calculate a hub score for an adult hub, wherein the adult hub is connected to a plurality of documents;
   a classifier block comprising a candidate document feature block configured to calculate a document score for a candidate document, the document score comprising a hub distance score measuring a hop distance between the candidate document and the adult hub, the hop distance corresponding to a total number of hops between the candidate document and the adult hub, and each hop corresponding to a direct connection between two Web documents, the classifier block configured to classify the candidate document as adult based on inputs comprising the document score of the candidate document and the hub distance score;
   a filter block configured to remove any candidate document classified as adult from the plurality of responses to the search query;
   a document feature block configured to calculate a document-level score for each of a plurality of documents in the network, said plurality of documents comprising at least one document connected to the candidate document in the network; and
   a synthetic feature block configured to calculate at least one synthetic score for each of a plurality of document groups associated with the plurality of documents in the network, each synthetic score comprising an aggregation of a plurality of document scores;
   the classifier block further configured to classify the candidate document as adult based on inputs comprising each of the at least one synthetic score.

2. The apparatus of claim 1, the candidate document feature block further comprising:
   an n-gram analyzer configured to count a number of occurrences of target n-grams in any text portion of the candidate document;
   a media analyzer configured to detect the occurrence of explicit adult content in image or video present in the candidate document; and
   an aggregation block configured to aggregate the number of occurrences counted by the n-gram analyzer and the detected occurrences of explicit adult content.

3. The apparatus of claim 1, at least one synthetic score comprising an aggregation of document-level scores over a single document group, at least one synthetic score comprising an aggregation of document scores over a single domain, and at least one synthetic score comprising an aggregation of document scores over a single host.

4. The apparatus of claim 1, each document group comprising documents associated with a single container.

5. The apparatus of claim 4, the adult hub detection block further comprising:
   a document aggregation block configured to aggregate document scores over all documents in the network connected to a hub candidate document;
   a hub candidate classifier block configured to classify the hub candidate document as being an adult hub if said aggregated document scores exceeds a threshold.

6. The apparatus of claim 4, the adult hub detection block further comprising:
   a preliminary adult document classifier block configured to classify a document as a preliminary adult document if the corresponding document score exceeds a first threshold;
   a preliminary adult group classifier block configured to classify a group as a preliminary adult group if the number of preliminary adult documents divided by a total number of documents in a document group exceeds a second threshold;
   a hub candidate classifier block configured to classify a candidate hub as an adult hub if the number of preliminary adult groups divided by a total number of document groups associated with the candidate hub exceeds a third threshold.

7. The apparatus of claim 6, wherein crowd-sourcing is utilized to verify the classification of at least one candidate hub as an adult hub.

8. The apparatus of claim 4, the candidate document feature block further comprising:
   a document classifier block configured to calculate a candidate document score corresponding to the candidate document;
   a container classifier block configured to calculate a candidate container score corresponding to a container to which the candidate document belongs;
   a domain classifier block configured to calculate a candidate domain score corresponding to a domain to which the candidate document belongs; and
   a classifier aggregation block configured to aggregate the candidate document, candidate container, and candidate domain scores; the classifier block further comprising:
   an adult status classification block configured to process the aggregated scores and the hub distance score using a classification algorithm to derive an adult status of the candidate document.

9. The apparatus of claim 8, wherein the classification algorithm is derived using machine learning techniques prior to receiving a user search request by the search engine.

10. A method executable by computer hardware for digitally deriving a classification for a candidate document retrieved in response to a search query submitted to an online search engine, the method comprising:
   calculating a hub score for an adult hub, wherein the adult hub is connected to a plurality of adult documents;
   calculating a document score for the candidate document, the document score comprising a hub distance score measuring a hop distance between the candidate document and the adult hub, the hop distance corresponding to a total number of hops between the candidate document and the adult hub, and each hop corresponding to a direct connection between two Web documents;
   classifying the candidate document as adult based on inputs comprising the document score of the candidate document and the hub score;
   calculating at least one synthetic score for each of a plurality of document groups associated with a plurality of documents, each synthetic score comprising an aggregation of a plurality of document scores, the classifying the candidate document as adult being further based on inputs comprising the at least one synthetic score; and if the candidate document is classified as adult, removing the candidate document from responses to a search query provided to the search engine.

11. The method of claim 10, the calculating the document score further comprising:
counting a number of occurrences of target n-grams in any text portion of the candidate document;
weighting each counted number by a target n-gram weighting factor; and
aggregating the weighted numbers to generate the document score.

12. The method of claim 10, at least one synthetic score comprising an aggregation of document scores over a single document group, at least one synthetic score comprising an aggregation of document scores over a single domain, and at least one synthetic score comprising an aggregation of document scores over a single host.

13. The method of claim 10, each document group comprising documents associated with a single container.

14. The method of claim 13, further comprising:
aggregating document scores over all documents connected to a hub candidate document;
classifying the hub candidate document as being an adult hub if the aggregated document scores exceeds a threshold.

15. The method of claim 13, further comprising:
classifying a document as a preliminary adult document if the corresponding document score exceeds a first threshold;
classifying a document group as a preliminary adult group if the number of preliminary adult documents divided by a total number of documents in a document group exceeds a second threshold;
classifying a candidate hub as an adult hub if the number of preliminary adult groups divided by a total number of document groups associated with the candidate hub exceeds a third threshold.

16. The method of claim 10, the classifying the candidate document as adult comprising:
calculating classifier scores corresponding to the candidate document, a container to which the candidate document belongs, and a domain to which the candidate document belongs;
aggregating the classifier scores; and
processing the aggregated classifier scores and the hub distance score using an algorithm to derive a status of the candidate document.

17. A search engine apparatus for responding to a search query submitted to an online search engine, the search engine apparatus comprising:
an adult hub detection block comprising computer hardware configured to calculate a hub score for an adult hub, wherein the adult hub is connected to a plurality of documents;
a classifier block comprising computer hardware configured to receive a plurality of candidate documents, and calculate a document score for each candidate document, the document score comprising a hub distance score measuring a hop distance between the candidate document and the adult hub, the hop distance corresponding to a total number of hops between the candidate document and the adult hub, and each hop corresponding to a direct connection between two Web documents, the classifier block further configured to classify an adult status of each candidate document based on inputs comprising the document score of each candidate document and the hub score;
a response block comprising computer hardware configured to return a candidate document classified as adult as a response to the search query, wherein the search query comprises a query for adult content;
a document feature block configured to calculate a document-level score for each of a plurality of documents in the network, said plurality of documents comprising at least one document connected to the candidate document in the network; and
a synthetic feature block configured to calculate at least one synthetic score for each of a plurality of document groups associated with the plurality of documents in the network, each synthetic score comprising an aggregation of a plurality of document scores;
the classifier block further configured to classify the candidate document as adult based on inputs comprising each of the at least one synthetic score.

18. The apparatus of claim 17, the response block further configured:
to rank a plurality of candidate documents classified as adult using a composite score based on said inputs; and
to display the plurality of candidate documents in sequence according to rank based on the composite score.

* * * * *